United States Patent
Kang

(10) Patent No.: US 10,539,451 B2
(45) Date of Patent: Jan. 21, 2020

(54) LOAD WEIGHING METHOD AND SYSTEM FOR WHEEL LOADER

(71) Applicant: Doosan Infracore Co., Ltd., Incheon (KR)

(72) Inventor: Hyun-Koo Kang, Incheon (KR)

(73) Assignee: DOOSAN INFRACORE CO., LTD., Incheon (KR)

( * ) Notice: Subject to any disclaimer, the term of this patent is extended or adjusted under 35 U.S.C. 154(b) by 240 days.

(21) Appl. No.: 15/346,150

(22) Filed: Nov. 8, 2016

(65) Prior Publication Data

US 2017/0131134 A1 May 11, 2017

(30) Foreign Application Priority Data

Nov. 9, 2015 (KR) .................. 10-2015-0156425

(51) Int. Cl.
| | | |
|---|---|---|
| G01G 7/00 | (2006.01) | |
| G01G 9/00 | (2006.01) | |
| G01G 11/00 | (2006.01) | |
| G01G 17/00 | (2006.01) | |
| G01G 19/00 | (2006.01) | |
| G06F 15/02 | (2006.01) | |
| G01G 19/14 | (2006.01) | |
| G01G 19/02 | (2006.01) | |
| G01G 19/08 | (2006.01) | |
| G01C 9/06 | (2006.01) | |
| G01L 13/00 | (2006.01) | |

(52) U.S. Cl.
CPC ............ *G01G 19/025* (2013.01); *G01C 9/06* (2013.01); *G01G 19/083* (2013.01); *G01L 13/00* (2013.01)

(58) Field of Classification Search
CPC .... G01G 19/025; G01G 19/0083; G01C 9/06; G01L 13/00
USPC .................................................. 702/173, 174
See application file for complete search history.

(56) References Cited

U.S. PATENT DOCUMENTS

| | | | | | |
|---|---|---|---|---|---|
| 4,627,013 | A | * | 12/1986 | Ichiyama ................ | E02F 9/264 177/141 |
| 2008/0169131 | A1 | * | 7/2008 | Takeda ...................... | E02F 9/26 177/136 |

(Continued)

FOREIGN PATENT DOCUMENTS

| | | |
|---|---|---|
| EP | 2511677 | 10/2012 |
| GB | 1372159 | * 10/1974 |

(Continued)

OTHER PUBLICATIONS

English Abstract of KR 20050009102, Jan. 2005.*

(Continued)

*Primary Examiner* — Michael P Nghiem
(74) *Attorney, Agent, or Firm* — K&L Gates LLP

(57) ABSTRACT

In a load weighing method for a wheel loader, an inclined angle of a ground surface on a slope where the wheel loader is working is detected. A change in a boom angle and a change in a pressure of a boom cylinder are detected while pivoting the boom and an attachment connected to the boom when a load is placed on the attachment. Weight of the load is calculated using the inclined angle of the ground surface, the change in the boom angle, and the change in the pressure of the boom cylinder as variables of a rotational dynamic equation for the pivot of the boom.

9 Claims, 5 Drawing Sheets

(56) References Cited

U.S. PATENT DOCUMENTS

| | | | | |
|---|---|---|---|---|
| 2008/0319710 | A1* | 12/2008 | Hsu | G01G 19/083 |
| | | | | 702/174 |
| 2010/0012611 | A1* | 1/2010 | Sawodny | B66C 13/063 |
| | | | | 212/273 |
| 2012/0315119 | A1* | 12/2012 | Magaki | B60W 20/00 |
| | | | | 414/685 |
| 2013/0345939 | A1* | 12/2013 | Magaki | E02F 9/2214 |
| | | | | 701/50 |
| 2014/0291038 | A1* | 10/2014 | Hague | G01G 19/10 |
| | | | | 177/1 |
| 2015/0217976 | A1* | 8/2015 | Tanizumi | B66C 13/46 |
| | | | | 703/2 |
| 2015/0275478 | A1* | 10/2015 | Yanagisawa | E02F 3/32 |
| | | | | 414/687 |
| 2017/0084193 | A1* | 3/2017 | Togasaka | G09B 19/0038 |
| 2017/0191245 | A1* | 7/2017 | Shatters | E02F 9/26 |

FOREIGN PATENT DOCUMENTS

| | | | |
|---|---|---|---|
| GB | 2324377 | * | 10/1998 |
| JP | 59084119 | * | 5/1984 |
| KR | 20050009102 | * | 1/2005 |
| WO | WO 2006098218 | * | 9/2006 |
| WO | 2007112718 | | 10/2007 |

OTHER PUBLICATIONS

English translation of WO 2007/112718. Oct. 2007.*
Extended Search Report issued in related European Patent Application No. 16197963.8 dated Mar. 23, 2017. 7 pages.

* cited by examiner

LOAD WEIGHING METHOD AND SYSTEM FOR WHEEL LOADER

PRIORITY STATEMENT

This application claims priority under 35 U.S.C. § 119 to Korean Patent Application No. 10-2015-0156425, filed on Nov. 9, 2015 in the Korean Intellectual Property Office (KIPO), the contents of which are herein incorporated by reference in their entirety.

FIELD OF TECHNOLOGY

Example embodiments relate to a load weighing method and system for a wheel loader. More particularly, Example embodiments relate to a method of measuring weight of a load in the wheel loader and a load weighing system for performing the same.

BACKGROUND

In general, an industrial vehicle such as a wheel loader is widely used to excavate sand, gravel, and the like and load it into a dump truck.

A loading charge for the dump truck may be estimated depending on an amount of a material loaded into the dump truck, and when an industrial vehicle travels in a state that weight of a load exceeds the maximum loading capacity for the dump truck, a penalty may be imposed. Further, overweight bucket loading may cause damages to the wheel loader. Accordingly, in order to prevent overloading of the dump truck and reduce cost of maintaining the wheel loader, it may be required to accurately measure weight of loads.

SUMMARY

Example embodiments provide a method of measuring weight of a load in a wheel loader working on a slope.

Example embodiments provide a system for measuring weight of a load in a wheel loader working on a slope.

According to example embodiments, in a load weighing method for a wheel loader, a change in a boom angle and a change in a pressure of a boom cylinder are detected while pivoting the boom and an attachment connected to the boom, wherein a load is placed on the attachment. Weight of the load is calculated by using an inclined angle of a ground surface, the change in the boom angle and the change in the pressure of the boom cylinder as variables of a rotational dynamic equation for the pivot of the boom.

In example embodiments, the method may further include detecting the inclined angle of the ground surface on a slope where the wheel loader is working.

In example embodiments, detecting the inclined angle of the ground surface may include receiving the inclined angle of the ground surface from at least one of an angle sensor included in a mobile phone and a map internet application.

In example embodiments, detecting the inclined angle of the ground surface may include detecting a change in the boom angle and a change in the pressure of the boom cylinder while pivoting the boom, wherein no load is placed on the attachment, and calculating the inclined angle of the ground surface using the change in the boom angle and the change in the pressure of the boom cylinder from the rotational dynamic equation for the pivot of the boom.

In example embodiments, detecting the inclined angle of the ground surface may further include receiving the inclined angle of the ground surface from at least one of an angle sensor included in a mobile phone and a map internet application, and when a difference between the received inclined angle of the ground surface and the calculated inclined angle of the ground surface exceeds a predetermined range, operating at least one of receiving the inclined angle of the ground surface and calculating the inclined angle of the ground surface again.

In example embodiments, calculating the weight of the load may include extracting a damping coefficient and an elastic coefficient from a predetermined damping coefficient map and elastic coefficient map corresponding to the change in the pressure of the boom cylinder.

In example embodiments, the rotational dynamic equation may be an equation representing a difference between no load torque and load torque prediction and derived by geometric relationships between the boom, the boom cylinder and the attachment.

In example embodiments, the method may further include outputting the calculated weight of the load.

According to example embodiments, a load weighing system for a wheel loader includes a detector including an angle sensor installed in a boom of the wheel loader to detect a change in an angle of the boom and a pressure sensor installed in a boom cylinder to detect a change in a pressure of the boom cylinder, and a calculator configured to calculate an inclined angle of a ground surface or weight of a load placed on an attachment connected to the boom using the change in the boom angle and the change in the pressure of the boom cylinder from a rotational dynamic equation for the pivot of the boom.

In example embodiments, the calculator may be adapted to calculate the inclined angle of the ground surface when no load is placed on the attachment, and the calculator may be adapted to calculate the weight of the load when the load is placed on the attachment.

In example embodiments, the load weighing system may further include an input portion configured to receive the inclined angle of the ground surface from at least one of an angle sensor included in a mobile phone and a map internet application.

In example embodiments, the load weighing system may further include a coefficient calculator including a damping coefficient map and an elastic coefficient map, a damping coefficient and an elastic coefficient corresponding to the change in the pressure of the boom cylinder being stored respectively in the damping coefficient map and the elastic coefficient map.

In example embodiments, the load weighing system may further include an output portion configured to provide a drive with the weight information of the load calculated by the calculator.

According to example embodiments, weight of a load in a wheel loader while working on a slope may be precisely measured. During loading work of the wheel loader, overloading of the dump truck may be prevented and overweight loading of a bucket may be prevented to thereby reduce cost of maintaining the wheel loader.

BRIEF DESCRIPTION OF THE DRAWINGS

Example embodiments will be more clearly understood from the following detailed description taken in conjunction with the accompanying drawings.

FIG. 1 is a side view illustrating a wheel loader in accordance with example embodiments.

FIG. 2 is a view illustrating a work apparatus of the wheel loader in FIG. 1.

FIG. 3 is a block diagram illustrating a load weighing system for the wheel loader in accordance with example embodiments.

FIG. 4 is a flowchart illustrating a load weighing method for a wheel loader in accordance with example embodiments.

FIG. 5 is a flowchart illustrating steps of detecting an inclined angle of a ground surface in FIG. 4.

DETAILED DESCRIPTION

Figure 1:
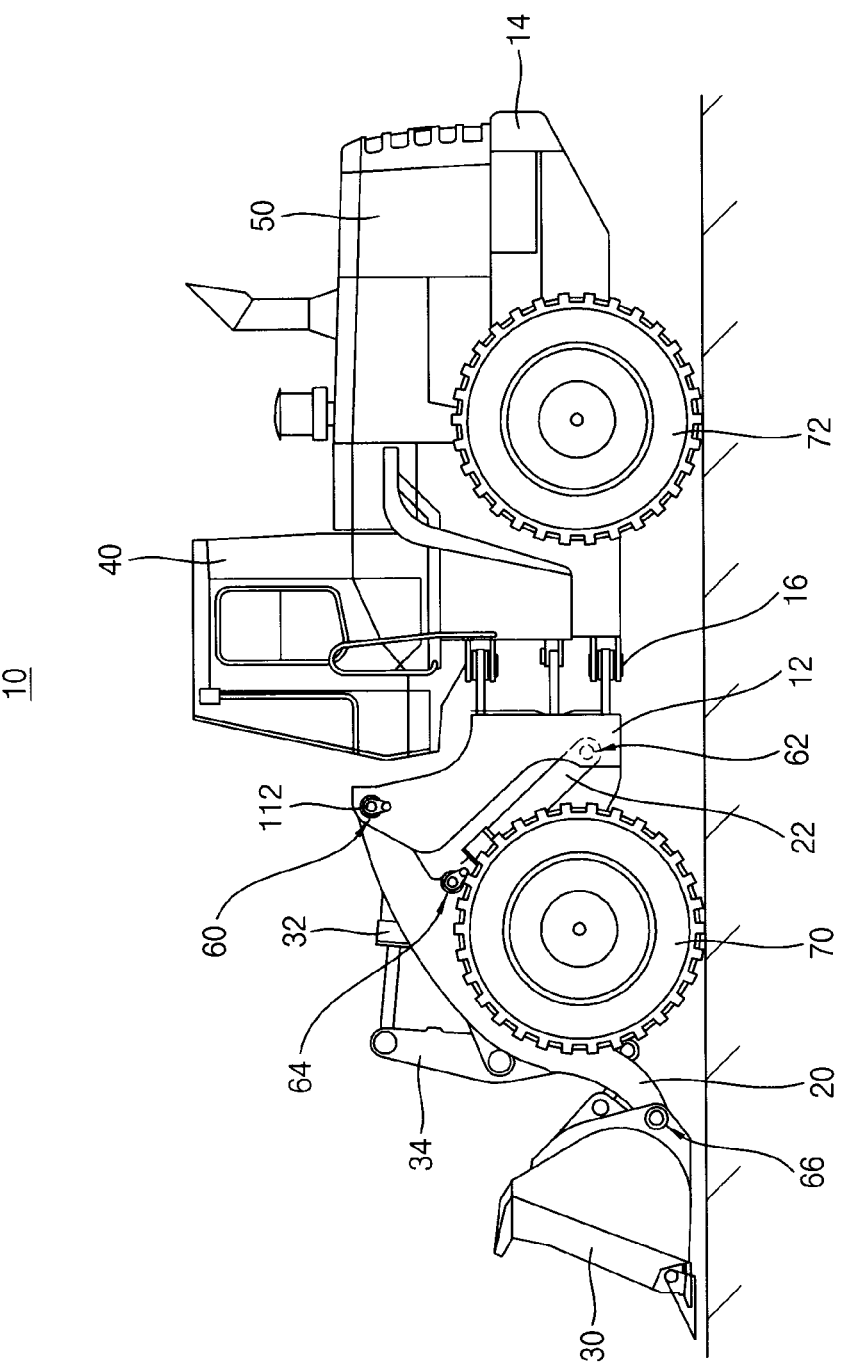
FIGS. 1 to 5 represent non-limiting, example embodiments as described herein.

Various example embodiments will be described more fully hereinafter with reference to the accompanying drawings, in which some example embodiments are shown. The present inventive concept may, however, be embodied in many different forms and should not be construed as limited to the example embodiments set forth herein. Rather, these example embodiments are provided so that this description will be thorough and complete, and will fully convey the scope of the present inventive concept to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, fourth etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive concept.

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
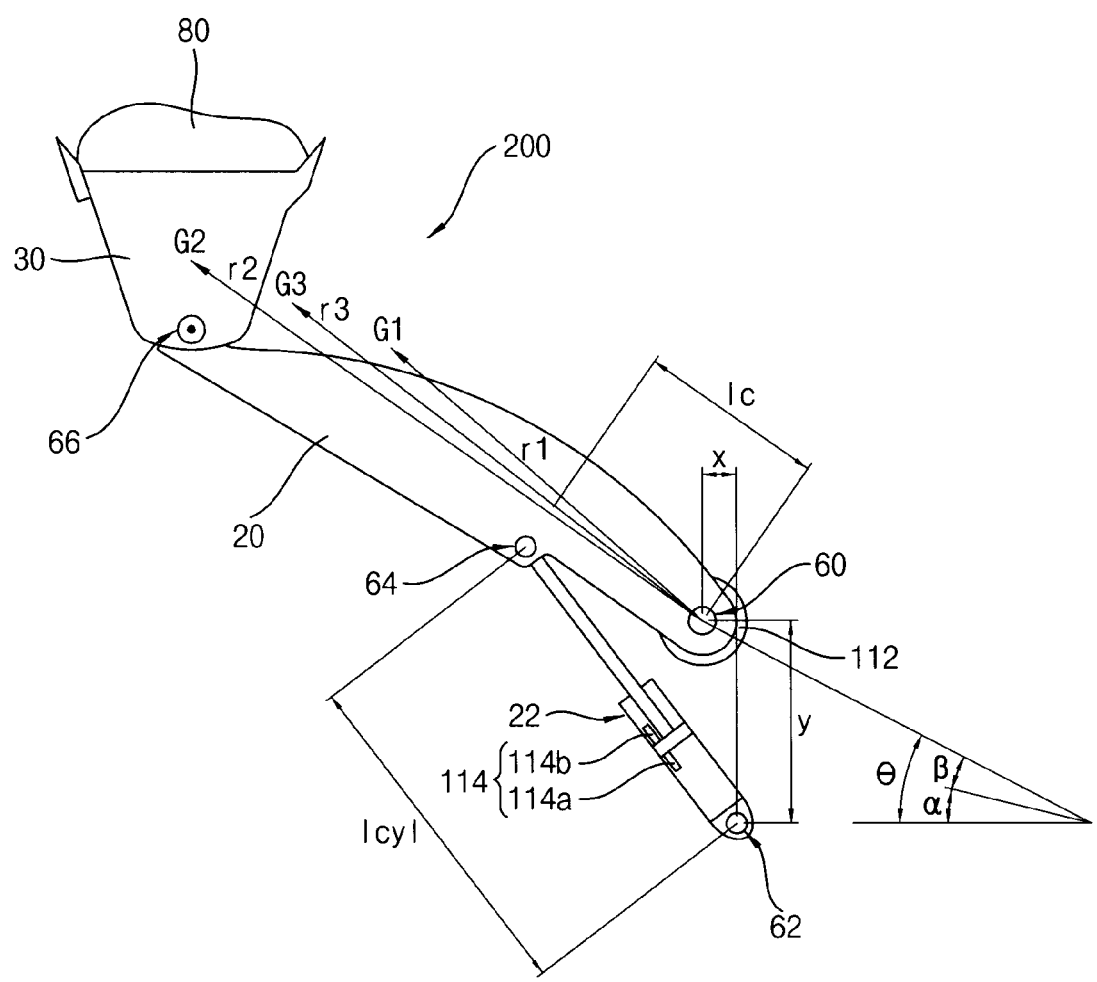
Figure 3:
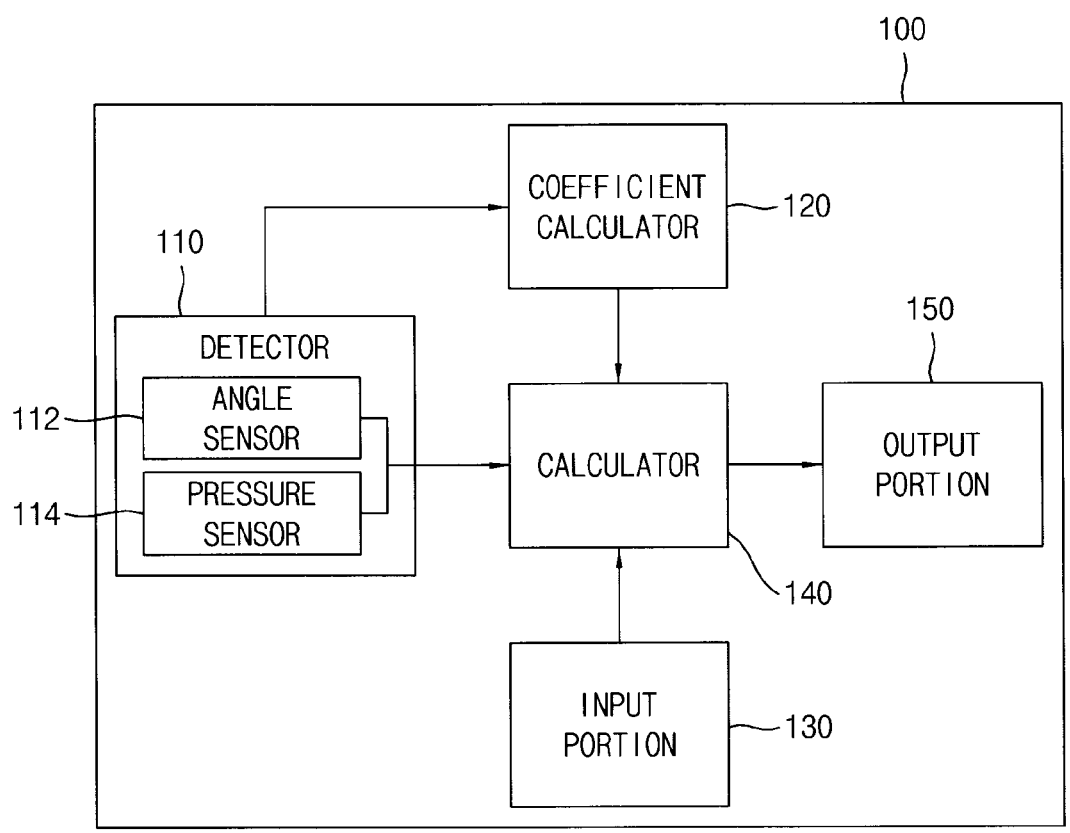

FIG. 1 is a side view illustrating a wheel loader in accordance with example embodiments. FIG. 2 is a view illustrating a work apparatus of the wheel loader in FIG. 1. FIG. 3 is a block diagram illustrating a load weighing system for the wheel loader in accordance with example embodiments.

Referring to FIGS. 1 to 3, a wheel loader 10 may include a front body 12 and a rear body 14 connected to each other. The front body 12 may include a work apparatus and a front wheel 70. The rear body 14 may include a driver cabin 40, an engine bay 50 and a rear wheel 72.

The work apparatus may include a boom 20 and a bucket 30. The boom 20 may be freely pivotally attached to the front body 12, and the bucket 30 may be freely pivotally attached to an end portion of the boom 20. Here, the work apparatus may further include other attachments according to customer's working needs. Hereinafter, for the convenience of explanation, the wheel loader including only the bucket 30 attached to the boom 20 as an attachment will be illustrated.

The boom 20 may be coupled to the front body 12 by a pair of boom cylinders 22. A first end portion of the boom cylinder 22 may be freely pivotally attached to the front body 12, and a second end portion of the boom cylinder 22 may be freely pivotally attached to the boom 20. The boom 20 may be pivoted upwardly and downwardly by expansion and contraction of the boom cylinders 22.

As the boom 20 rotates, the boom 20 may have a first angle ($\theta$) with respect to the horizontal plane. The horizontal plane may be a plane that is perpendicular to the gradient of the gravity field. On the other hand, when the wheel loader 20 is operating on a slope, an angle of a ground surface with respect to the horizontal plane, that is, an inclined angle of the ground surface may be a second angle ($\alpha$), and an angle of the boom 20 with respect to the inclined angle may be a third angle ($\beta$). The first angle ($\theta$) may be equal to the sum of the second angle ($\alpha$) and the third angle ($\beta$).

A tilt arm 34 may be freely rotatably supported on the boom 20, almost at its central portion. A first end portion of the tilt arm 34 may be coupled to the front body 12 by a pair of bucket cylinders 32 and a second end portion of the tilt arm 34 may be coupled to the bucket 30 by a tilt rod, so that the bucket 30 may pivot (crowd and dump) as the bucket cylinder 32 expands and contracts.

A relationship between the boom 20, the boom cylinder 22 and the bucket 30 may be illustrated in FIG. 2. As illustrated in FIG. 2, a boom joint 60 in a first end portion of the boom 20 may be freely pivotally attached to the front body 12, and the bucket 30 may be freely pivotally attached to a bucket joint 66 in a second end portion of the boom 20. A boom cylinder joint 62 in the first end portion of the boom cylinder 22 may be freely pivotally attached to the front body 12, and the second end portion of the boom cylinder 22 may be freely pivotally attached to a boom cylinder link mount 64 of the boom 20.

In this case, the boom joint 60 may be spaced apart from the boom cylinder joint 62 in a horizontal direction by a fourth distance (x) and in a vertical direction by a fifth distance (y). A distance between the boom joint 60 and the boom cylinder link mount 64 may be a sixth distance (lc), and a distance between the boom cylinder joint 62 and the boom cylinder link mount 64 may be a seventh distance (lcyl). The seventh distance (lcyl) may be a length of the boom cylinder 22.

A center of gravity of the boom 20 and the bucket 30 may be a first center of gravity (G1), and a center of gravity of a load 80 may be a second center of gravity (G2). For example, the second center of gravity (G2) may be positioned in the center of the bucket 30. A center of gravity of a system including the boom 20, the bucket 30 and the load 80 may be a third center of gravity (G3). In this case, distances between the first, second and third centers of gravity (G1, G2, G3) and the boom joint 60 may be a first distance (r1), a second distance (r2) and a third distance (r3), respectively. For example, the third distance (r3) may be greater than the first distance (r1) and less than the second distance (r2).

As a cylinder rod of the boom cylinder 22 expands, the boom 20 may pivot about the boom joint 60, so that the bucket 30 and the load 80 may move upwardly. Here, the expansion of the cylinder rod may means that the cylinder rod moves and thus the length of the boom cylinder 22 (lcyl, the seventh distance) increases. As the length of the boom cylinder 22 (lcyl, the seventh distance) increases, the system including the boom 20, the bucket 30 and the load 80 may pivot in a clockwise direction about the boom joint 60. Hereinafter, for the convenience of explanation, the system including the boom 20, the bucket 30 and the load 80 may be referred to as a pivoting system 200.

An engine and a travel apparatus for propelling the wheel loader 10 may be mounted at the rear body 14. The engine may be provided in the engine bay 50 to supply an output power to the travel apparatus. The travel apparatus may include, for example, a torque converter, a transmission, a propeller shaft, axles, etc.

The front body 12 and the rear body 14 may be rotatably connected to each other through a center pin 16 so that the front body 12 may swing side to side with respect to the rear body 14 by expansion and contraction of a steering cylinder (not illustrated).

In example embodiments, the wheel loader 10 may include a load weighing system 100 for measuring weight of a load. As illustrated in FIG. 3, the load weighing system 100 may include a detector 110, a coefficient calculator 120, an input portion 130, a calculator 140 and an output portion 150.

The detector 110 may detect an angle ($\beta$) of the boom 20, a pressure (P1, P2) of the boom cylinder 22 and an engine speed of the engine. The detected values may be inputted into the coefficient calculator 120 and the calculator 140.

In example embodiments, the detector 110 may include a plurality of sensors. For example, the detector 110 may include at least one angle sensor 112 and at least one pressure sensor 114.

The angle sensor 112 may be installed in the boom joint 60 to measure the angle ($\beta$) of the boom 20. For example, the angle sensor may be a hall effect sensor. The hall effect sensor may be installed in the boom joint 60 as a rotational axis of the boom 20, and may measure the angle ($\beta$) of the boom 20 by detecting a change of magnetic flux density according to the pivot of the boom 20. The detected angle ($\beta$) of the boom 20 may be inputted to the calculator 140.

The pressure sensor 114 may be installed in the boom cylinder 22 to measure the pressure (P1, P2) of the boom cylinder 22. For example, the pressure sensor 114 may include a first pressure sensor 114a installed in a cylinder head side of the boom cylinder 22, and a second pressure sensor 114b installed in a cylinder rod side of the boom cylinder 22. The first pressure sensor 114a may detect a pressure P1 of the cylinder head side, and the second pressure sensor 114b may detect a pressure P2 of the cylinder rod side. The pressure of the boom cylinder 22 may be a pressure difference between the pressures detected by the first and second pressures sensors 114a and 114b. The detected pressure of the boom cylinder 22 may be inputted to the coefficient calculator 120 and the calculator 140.

In example embodiments, the detector 110 may further include an engine speed sensor (not illustrated) for detecting a rotational speed of the engine. The engine speed sensor may include a mechanical tachometer, an electrical tachometer, a hall sensor, an optical sensor, etc. The detected engine speed may be inputted to the coefficient calculator 120 and the calculator 140. Alternatively, the detector may not include the engine speed sensor, and may receive the values of the engine speed from an engine control unit (ECU).

The coefficient calculator 120 may determine a damping coefficient and an elastic coefficient of the work apparatus using data and information from the detector 110.

In example embodiments, the coefficient calculator 120 may include a damping coefficient map and an elastic coefficient map obtained through experiments in advance. The damping coefficient map may represent relationships between the engine speed, a change rate of the pressure of the boom cylinder 22 and the damping coefficients, and the elastic coefficient map may represent relationships between the engine speed, the change rate of the pressure of the boom cylinder 22 and the elastic coefficients. The coefficient calculator 120 may receive the engine speed and the pressure of the boom cylinder 22 from the detector 110 and then may calculate a pressure change rate of the boom cylinder 22 with respect to time. The coefficient calculator 120 may extract a damping coefficient and an elastic coefficient from the damping coefficient map and the elastic coefficient map corresponding to the inputted engine speed and pressure change rate of the boom cylinder 22. The extracted damping coefficient and elastic coefficient may be inputted to the calculator 140.

The input portion 130 may receive information of the inclined angle ($\alpha$) of the ground surface from an operator and may input it to the calculator 140. For example, the input portion 130 may include an instrument panel (not illustrated) provided within the driver cabin 40. An operator may receive information of the inclined angle ($\alpha$) of the ground surface in a work area through an angle sensor included in a mobile phone, a map internet application such as Google Maps, etc, and may input directly the information through the instrument panel to the input portion 130, or the input portion 130 may be connected to a telematics system (TMS) to receive a ground surface inclined angle. Alternatively, as described later, an inclined angle measuring mode may be performed to measure an inclined angle ($\alpha$) of the ground surface. In this case, the input portion 130 may be omitted in the load weighing system 100.

The calculator 140 may use the information inputted from the detector 110 to calculate weight of the load 80. In particular, the calculator 140 may receive the damping coefficient and the elastic coefficient from the coefficient calculator 120, may receive the inclined angle ($\alpha$) of the ground surface from the input portion 130, and may receive the angle ($\beta$) of the boom 20 with respect to the inclined angle and the pressure of the boom cylinder 22 from the detector 110. The calculator 140 may calculate the weight of the load 80 using the inputted information. Hereinafter, steps of measuring the weight of the load 80 performed in the calculator 140 will be explained in detail.

Referring again to FIG. 2, as the cylinder rod of the boom cylinder 22 expands, the pivoting system 200 including the boom 20, the bucket 30 and the load 80 may pivot in a clockwise direction. Here, a rotational dynamic equation of the pivoting system 200 may be expressed by following [Equation 1]

$$J\ddot{\theta}+c\dot{\theta}+k\theta=T-T_L \quad \text{[Equation 1]}$$

Here, J is moment of inertia of the pivoting system 200, and c and k are a damping coefficient and a modulus of elasticity of the pivoting system 200. T represents a torque acting on the pivoting system 200 including the bucket 30 with no load, that is, no load torque, and $T_L$ represents a torque acting on the pivoting system 200 including the bucket 30 with load 80, that is, load torque. Additionally, θ represents an angle of the boom 20 with respect to the horizontal plane, and accordingly, $\dot{\theta}$ and $\ddot{\theta}$ represent an angular speed and an angular acceleration of the boom 20 respectively.

The moment of inertia (J) of the pivoting system 200 may be calculated by following [Equation 2].

$$J=\Sigma mr^2 = m_1 r_1^2 + m_2 r_2^2 \quad \text{[Equation 2]}$$

Here, $m_1$ is a mass of the boom 20 and the bucket 30, and $m_2$ is a mass of the load 80. $r_1$ (first distance) is a distance of the first center of gravity (G1) from the boom joint 60, and $r_2$ (second distance) is a distance of the second center of gravity (G2) from the boom joint 60.

The no load torque (T) may be expressed using a geometry between the boom 20 and the boom cylinder 22 by following [Equation 3].

$$T = l_c \sqrt{1 - \left(\frac{x^2 + y^2 - l_{cyl}^2 - l_c^2}{2l_{cyl}l_c}\right)^2} F \quad \text{[Equation 3]}$$

Here, F, i.e., a force acting on the boom cylinder 22, may be calculated using inner pressures of the boom cylinder 22 detected by the first and second pressure sensors 114a and 114b respectively. In particular, the force F may be expressed by following [Equation 4].

$$F = P_1 A_1 - P_2 A_2 \quad \text{[Equation 4]}$$

Here, $P_1$ is a pressure of the cylinder head side of the boom cylinder 22 detected by the first pressure sensor 114a, and $A_1$ is an area of the cylinder head side. $P_2$ is a pressure of the cylinder rod side of the boom cylinder 22 detected by the second pressure sensor 114b, and $A_2$ is an area of the cylinder rod side.

The load torque ($T_L$) may be expressed using a geometry between the boom 20 and the boom cylinder 22 by following [Equation 5].

$$T_L = m_3 g r_3 \cos\theta = (m_1+m_2) g r_3 \cos\theta \quad \text{[Equation 5]}$$

Here, $m_3$ is a mass of the pivoting system 200 including the boom 20, the bucket 30 and the load 80, $r_3$ (third distance) is a distance of the third center of gravity (G3) of the pivoting system 200 from the boom joint 60, and g represents the gravitational acceleration.

The third distance ($r_3$) and the first and second distances ($r_1$, $r_2$) may satisfy following [Equation 6].

$$r_3 = \frac{m_2 r_2 + m_1 r_1}{m_1 + m_2} \quad \text{[Equation 6]}$$

By substituting [Equation 6] into [Equation 5], the load torque ($T_L$) may be expressed by [Equation 7].

$$T_L = m_1 g r_1 \cos\theta + m_2 g r_2 \cos\theta \quad \text{[Equation 7]}$$

On the other hand, the first angle (θ) may be equal to the sum of the second angle (α) and the third angle (β), and thus, accordingly, the angular speed ($\dot{\theta}$) and the angular acceleration ($\ddot{\theta}$) of the boom 20 may be expressed by [Equation 8].

$$\theta = \alpha+\beta, \dot{\theta}=\dot{\alpha}+\dot{\beta}=\dot{\beta}, \ddot{\theta}=\ddot{\alpha}+\ddot{\beta}=\ddot{\beta} \quad \text{[Equation 8]}$$

By substituting [Equation 2], [Equation 3], [Equation 4], [Equation 7] and [Equation 8] into [Equation 1], the mass ($m_2$) of the load 80 may be expressed by [Equation 9].

[Equation 9]

$$\hat{m}_2 = \frac{l_c\sqrt{1 - \left(\frac{x^2+y^2-l_{cyl}^2-l_c^2}{2l_{cyl}l_c}\right)^2}(P_1 A_1 - P_2 A_2) - m_1 r_1^2 \ddot{\beta} - c\dot{\beta} - k(\alpha+\beta) - gm_1 r_1 \cos(\alpha+\beta)}{r_2^2 \ddot{\beta} + gr_2 \cos(\alpha+\beta)}$$

The damping coefficient (c) and the elastic coefficient (k) may be obtained from the coefficient calculator 120. The coefficient calculator 120 may receive the engine speed and the pressure information of the boom cylinder 22 from the detector 110. The coefficient calculator 120 may perform linear interpolation on the pressures with respect to time to calculate a pressure change rate, and may extract the damping coefficient (c) and the elastic coefficient (k) corresponding to the engine speed and pressure change rate. The extracted damping coefficient and elastic coefficient may be inputted to the calculator 140.

The inclined angle (α) of the ground surface may be obtained from the input portion 130, and the angle (β) of the boom 20 with respect to the inclined angle and the pressure (P1, P2) of the boom cylinder 22 may be obtained from the detector 110.

The calculator 140 may calculate the angular speed ($\dot{\beta}$) and the angular acceleration ($\ddot{\beta}$) of the boom 20 from the inputted angle (β) information of the boom 20. For example, the calculator may perform Kalman filtering on the angle (β) of the boom 20 to calculate the angular speed ($\dot{\beta}$) and the angular acceleration ($\ddot{\beta}$) of the boom 20.

By putting the known values (lc, lcyl, x, y, $A_1$, $A_2$, m1, $r_1$, $r_2$, g), the values (P1, P2, β) inputted from the detector 110, the values (c, k) inputted from the coefficient calculator 120 and the values ($\dot{\beta}$, $\ddot{\beta}$) calculated by the calculator 140 in [Equation 9], the calculator 140 may calculate the weight of the load 80 loaded in the wheel loader 10 while working on the slope.

In example embodiments, the calculator 140 may calculate the inclined angle (α) of the ground surface through the boom 20 raising manipulation. That is, even though the calculator 140 does not receive the inclined angle (α) of the ground surface from the input portion 130, the calculator 140 may calculate directly the inclined angle (α) of the ground surface using information detected by the detector 110 while the boom 20 moves upward.

For example, while the bucket 30 with no load moves upward, the angle (β) of the boom 20 and the pressure ($P_1$, $P_2$) of the boom cylinder 22 may be detected by the detector 110, and then, the calculator 140 may use the detected information to calculate the inclined angle (α) of the ground surface. Hereinafter, steps of calculating the inclined angle (α) of the ground surface performed in the calculator 140 will be explained in detail.

Because the load 80 is not loaded in the bucket 30, the mass ($m_2$) of the load 80 in [Equation 9] may be substituted with zero. Then, [Equation 9] may be rewritten for the inclined angle (α) of the ground surface. In here, following two assumptions may be used for linearization and simplification of equation.

$$\cos(\alpha+\beta) = \cos\alpha\cos\beta - \sin\alpha\sin\beta \approx \cos\alpha\cos\beta \quad \text{[Assumption 1]}$$

$$k(\alpha+\beta) \approx 0 \quad \text{[Assumption 2]}$$

Thus, following [Equation 10] may be obtained.

$$\alpha = \cos^{-1}\left(\frac{l_c\sqrt{1-\left(\frac{x^2+y^2-l_{cyl}^2-l_c^2}{2l_{cyl}l_c}\right)^2}(P_1A_1 - P_2A_2) - m_1r_1^2\ddot{\beta} - c\dot{\beta}}{gm_1r_1\cos\beta}\right) \quad \text{[Equation 10]}$$

By putting the known values (lc, lcyl, x, y, $A_1$, $A_2$, m1, $r_1$, $r_2$, g), the values (P1, P2, β) inputted from the detector 110, the value (c) inputted from the coefficient calculator 120 and the values ($\dot{\beta}$, $\ddot{\beta}$) calculated by the calculator 140 in [Equation 10], the calculator 140 may calculate the inclined angle (α) of the ground surface in a work area.

In example embodiments, the load weighing system 100 may further include a comparator (not illustrated) configured to compare the inclined angle of the ground surface inputted from the input portion 130 and the inclined angle of the ground surface calculated by the calculator 140. That is, even though the load weighing system 100 receives the inclined angle of the ground surface from the input portion 130, the load weighing system 100 may calculate directly the inclined angle of the ground surface using the information inputted from the detector 110. Then, as a result of the comparison, when the difference exceeds a predetermined range, the load weighing system 100 may require an operator to input the inclined angle of the ground surface or may recalculate the steps to thereby improve measurement accuracy of the inclined angle (α) of the ground surface. Thus, measurement accuracy of the mass ($m_2$) of the load 80 may be improved.

The mass ($m_2$) of the load 80 calculated by the calculator 140 may be provided to the operator through the output portion 150. For example, the output portion may include a visual display device such as an instrument panel, an audio output device such as a speaker, etc.

In example embodiments, the load weighing system 100 may further include a selection switch (not illustrated) configured to select one mode of methods of obtaining an inclined angle of the ground surface. For example, the selection switch may include an inclined angle input mode and an inclined angle measuring mode. In the inclined angle input mode, an inclined angle of a ground surface may be inputted externally. In the inclined angle measuring mode, an inclined angle of a ground surface may be calculated by itself.

When the inclined angle input mode is selected, a driver may input directly the inclined angle of the ground surface through an instrument panel, or the input portion 130 may be connected to a mobile phone or a computing system to receive the inclined angle.

When the inclined angle input mode is selected, while the bucket 30 with no load moves upward, the angle of the boom 20 and the pressure of the boom cylinder 22 may be detected by the detector 110, and then, the calculator 140 may use the detected information to calculate the inclined angle of the ground surface.

As mentioned above, the load weighing system 100 may measure precisely the weight of the load 80 loaded in the wheel loader 10 while working on the slope. During loading work, the weight of the material loaded into a dump truck may be measured precisely to prevent overloading of the dump truck. Further, overweight loading of the bucket 30 may be prevented to thereby reduce cost of maintaining the wheel loader.

Hereinafter, a method of measuring weight of a load 80 on the wheel loader 10 using the load weighing system 100 in FIG. 4 will be explained.

Figure 4:
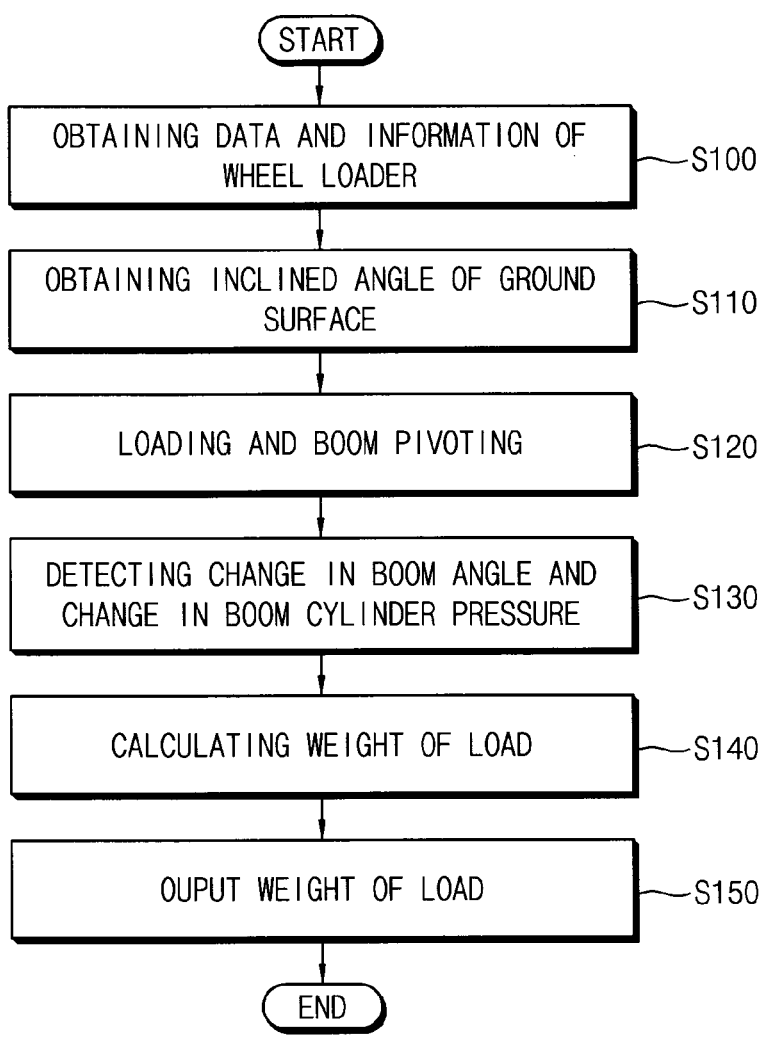
Figure 5:
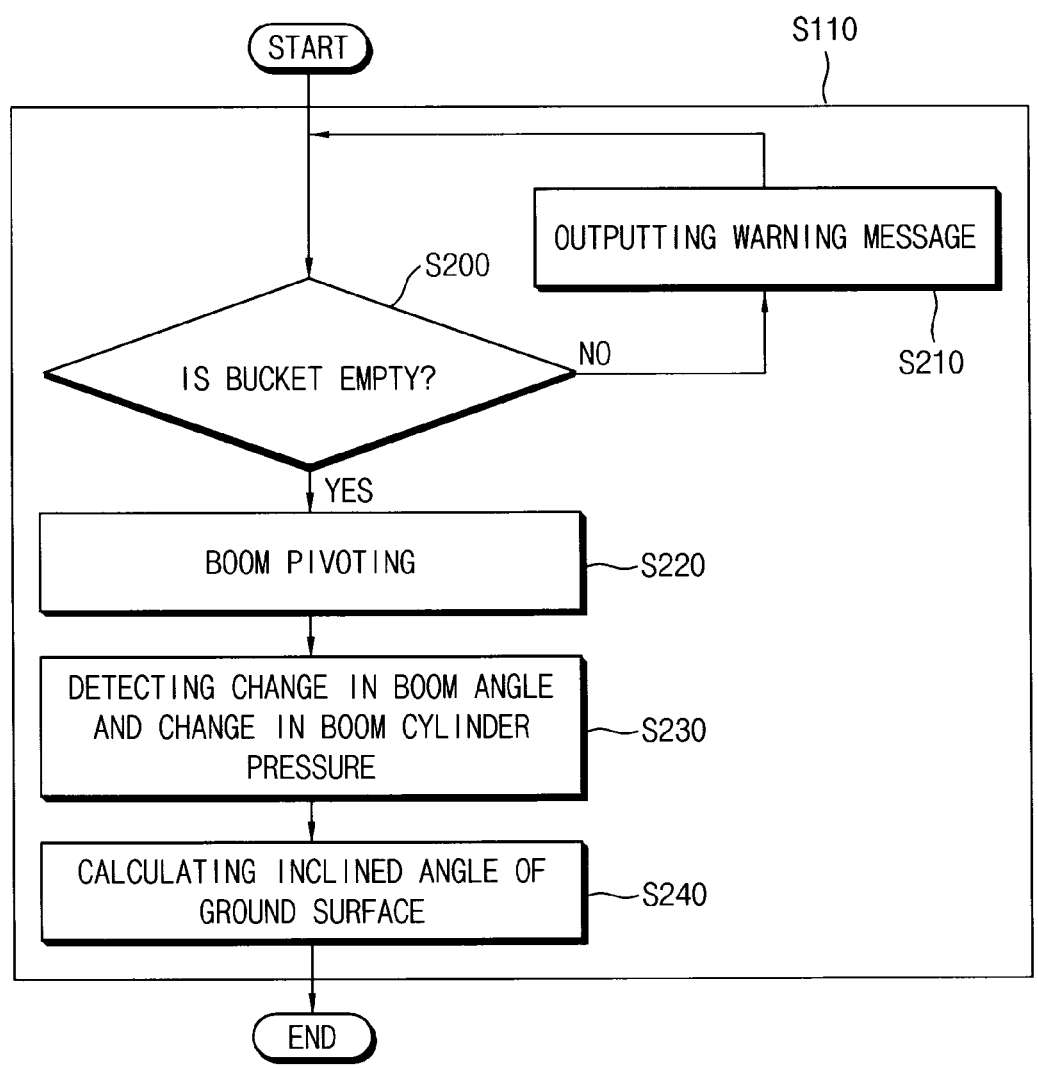

FIG. 4 is a flowchart illustrating a load weighing method for a wheel loader in accordance with example embodiments. FIG. 5 is a flowchart illustrating steps of detecting an inclined angle of a ground surface in FIG. 4.

Referring to FIG. 4, data and information of a wheel loader 10 may be obtained (S100).

An operator may input data and information of the wheel loader 10 through an input portion 130. As illustrated in FIG. 2, the data and information may include, for example, a mass ($m_1$) of a boom 20 and a bucket 30, a distance ($r_1$) of a center of gravity (G1) of the boom 20 and the bucket 30 from a boom joint 60, a distance ($r_2$) of a center of gravity (G2) of a load 80 from the boom joint 60, a horizontal distance (x) and a vertical distance (y) between the boom joint 60 and a boom cylinder joint 62, a distance (lc) between the boom joint 60 and a boom cylinder link mount 64, and inner areas ($A_1$, $A_2$) of the boom cylinder 22. Alternatively, the data and information may be inputted in advance and stored in the input portion 130.

Then, an inclined angle of a ground surface may be obtained (S110).

For example, the operator may receive information of the inclined angle (α) of the ground surface in a work area through an angle sensor included in a mobile phone, a map internet application such as Google Maps, etc, and may input directly the inclined angle (α) of the ground surface through the input portion 130.

Alternatively, without using an external device such as the mobile phone, a detector 110 and a calculator 130 may be used to obtain the inclined angle of the ground surface, as illustrated in FIG. 5.

Referring to FIG. 5, first, whether the bucket 30 is empty or not may be checked (S200), and then, when the load 80 is loaded in the bucket 30, a warning message may be outputted (S210).

For example, whether the load 80 is placed on the bucket 30 or not may be determined using a pressure sensor, and then, when the load 80 is placed in the bucket 30, the operator may be notified using a buzzer, a lamp, a display device, etc.

When no load is placed in the bucket 30, while the boom pivots (S220), a change in the angle of the boom 20 and a change in a pressure of the boom cylinder 22 may be detected (S230).

For example, the angle (β) of the boom 20 with respect to the inclined angle may be detected by an angle sensor 112 installed in the boom joint 60, and the inner pressure ($P_1$, $P_2$) of the boom cylinder 22 may be detected by a pressure sensor 114. Then, the change in the angle of the boom 20 and the change in the pressure of the boom cylinder 22 with respect to time may be monitored. The detected angle and pressure may be inputted into a calculator 140.

The calculator 140 may calculate an angular speed ($\dot{\beta}$) and an angular acceleration ($\ddot{\beta}$) of the boom 20 using the inputted angle (β) of the boom 20, and may calculate the inclined angle (α) of the ground surface using [Equation 10].

In example embodiments, the load weighing method may further include comparing the inputted inclined angle of the ground surface and the calculated inclined angle of the ground surface.

In particular, an operator may obtain the inclined angle of the ground surface in a work area using an external device such as a mobile phone, and may input the information through the input portion 130. Then, while moving the bucket 30 with no load upwardly, operation state information of the wheel loader 10 may be obtained. The inclined angle of the ground surface may be calculated using the calculator 140. Then, the inputted inclined angle of the ground surface and the calculated inclined angle of the ground surface may be compared with each other. When a difference between the inputted inclined angle of the ground surface and the calculated inclined angle of the ground surface exceeds a predetermined range, the operator may be required to input inclined angle information of the ground surface again. Alternatively, assuming that the inputted inclined angle of the ground surface is correct, recalculation may be performed to verify the calculated inclined angle of the ground surface. Thus, measurement accuracy of the inclined angle ($\alpha$) of the ground surface may be improved, and further, measurement accuracy of a mass ($m_2$) of the load 80 may be improved.

After obtaining the inclined angle information of the ground surface, the load 80 may be placed on the bucket 30 and the bucket 30 with the load 80 may be pivoted (S120). Then, the change in the angle of the boom 20 and the change in the pressure of the boom cylinder 22 may be detected (S130).

For example, the angle ($\beta$) of the boom 20 with respect to the inclined angle may be detected by the angle sensor 112 installed in the boom joint 60, and the inner pressure ($P_1$, $P_2$) of the boom cylinder 22 may be detected by the pressure sensor 114 installed in the boom cylinder 22. Then, the change in the angle of the boom 20 and the change in the pressure of the boom cylinder 22 with respect to time may be monitored. Additionally, information of an engine speed may be obtained using an engine speed sensor. The obtained information may be inputted into a coefficient calculator 120 and the calculator 140.

The coefficient calculator 120 may determine a damping coefficient (c) and an elastic coefficient (k) using the inputted engine speed and change in the pressure of the boom cylinder 22. The calculated damping coefficient (c) and elastic coefficient (k) may be inputted to the calculator 140.

The calculator 140 may calculate the angular speed ($\dot{\beta}$) and the angular acceleration ($\ddot{\beta}$) of the boom 20 from the inputted angle ($\beta$) of the boom 20, and may and may calculate weight of the mass ($m_2$) of the load 80 using [Equation 9].

The weight of the mass ($m_2$) of the load 80 may be provided to the operator through an output portion 150 (S150).

For example, the weight of the mass ($m_2$) of the load 80 may be displayed with letters or numbers in the instrument panel, or may be notified to the operator by a speaker. Alternatively, only when the mass ($m_2$) of the load 80 exceeds the maximum loading capacity of the bucket 30, a warning message may be displayed.

As mentioned above, according to the load weighing method, the weight of the load 80 loaded in the wheel loader 10 while working on the slope may be precisely measured. During loading work of the wheel loader, the weight of the material loaded into a dump truck may be measured precisely to prevent overloading of the dump truck. Further, overweight loading of the bucket 30 may be prevented to thereby reduce cost of maintaining the wheel loader 10.

The foregoing is illustrative of example embodiments of the invention and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A load weighing method for a wheel loader, comprising:

detecting an inclined angle of a ground surface on a slope where the wheel loader is working;

detecting a change in a boom angle with respect to the inclined angle and a change in a pressure of a boom cylinder while pivoting a boom and an attachment connected to the boom, wherein a load is placed on the attachment;

calculating a mass of the load by using a rotational dynamic equation for the pivot of the boom, wherein the rotational dynamic equation is:

$$J\ddot{\theta}+c\dot{\theta}+k\theta=T-T_L$$

wherein J is a moment of inertia of the pivot of the boom and equal to $m_1 r_1^2 + m_2 r_2^2$, wherein $m_1$ is a mass of the boom and a bucket, $m_2$ is the mass of the load, $r_1$ is a distance of a first center of gravity from a boom joint, and $r_2$ is distance of a second center of gravity from the boom joint, c is a damping coefficient of the pivot of the boom, k is a modulus of elasticity of the pivot of the boom, T is a torque acting on the pivot of the boom including the bucket with no load, $T_L$ is a load torque of the pivot of the boom, $\theta$ represents an angle of the boom with respect to a horizontal plane and is equal to a sum of the inclined angle of the ground surface and the boom angle with respect to the inclined angle, and $\dot{\theta}$ and $\ddot{\theta}$ represent an angular speed and an angular acceleration of the boom; and providing the calculated weight of the bad to an operator via an output portion selected from the group consisting of a visual display device and an audio output device.

2. The method of claim 1, wherein detecting the inclined angle of the ground surface comprises receiving the inclined angle of the ground surface from at least one of an angle sensor included in a mobile phone and a map internet application.

3. The method of claim 1, wherein detecting the inclined angle of the ground surface comprises:

detecting a change in the boom angle and a change in the pressure of the boom cylinder while pivoting the boom, when no load is placed on the attachment; and calculating the inclined angle of the ground surface using the rotational dynamic equation for the pivot of the boom.

4. The method of claim 3, wherein detecting the inclined angle of the ground surface further comprises:
receiving the inclined angle of the ground surface from at least one of an angle sensor included in a mobile phone and a map internet application; and
when a difference between the received inclined angle of the ground surface and the calculated inclined angle of the ground surface exceeds a predetermined range, receiving the inclined angle of the ground surface or calculating the inclined angle of the ground surface again.

5. The method of claim 1, wherein calculating the weight of the load comprises extracting a damping coefficient and an elastic coefficient respectively from a predetermined damping coefficient map and a predetermined elastic coefficient map corresponding to the change in the pressure of the boom cylinder.

6. A bad weighing system for a wheel loader, comprising:
a detector including an angle sensor installed in a boom of the wheel loader to detect a change in a boom angle with respect to an inclined angle of a ground surface and a pressure sensor installed in a boom cylinder to detect a change in a pressure of the boom cylinder;
a coefficient calculator including a damping coefficient map and an elastic coefficient map, a damping coefficient and an elastic coefficient corresponding to the change in the pressure of the boom cylinder being stored respectively in the damping coefficient map and the elastic coefficient map, wherefrom the damping coefficient is extracted; and
a calculator configured to calculate a mass of a bad placed on an attachment connected to the boom using a rotational dynamic equation for the pivot of the boom, wherein the rotational dynamic equation is:

$$J\ddot{\theta}+c\dot{\theta}+k\theta=T-T_L$$

wherein J is a moment of inertia of the pivot of the boom and equal to $m_1 r_1^2\ m_2 r_2^2$, wherein $m_1$ is a mass of the boom and a bucket, $m_2$ is the mass of the bad, $r_1$ is a distance of a first center of gravity from a boom joint, and $r_2$ is distance of a second center of gravity from the boom joint,
c is the extracted damping coefficient of the pivot of the boom,
k is a modulus of elasticity of the pivot of the boom,
T is a torque acting on the pivot of the boom including the bucket with no load,
$T_L$ is a load torque of the pivot of the boom,
θ represents an angle of the boom with respect to a horizontal plane and is equal to a sum of the inclined angle of the ground surface and the boom angle with respect to the inclined angle, and
$\dot{\theta}$ and $\ddot{\theta}$ represent an angular speed and an angular acceleration of the boom; and
an output portion selected from the group consisting of a visual display device and an audio output device, the output portion configured to provide a driver with the weight of the load calculated by the calculator.

7. The load weighing system of claim 6, wherein the calculator is adapted to calculate the inclined angle of the ground surface when no load is placed on the attachment, and the calculator is adapted to calculate the weight of the load when the load is placed on the attachment.

8. The load weighing system of claim 6, further comprising an input portion configured to receive the inclined angle of the ground surface from at least one of an angle sensor.

9. A load weighing method for a wheel loader, comprising:
detecting an inclined angle of a ground surface on a slope where the wheel loader is working;
detecting a change in a boom angle with respect the inclined angle and a change in a pressure of a boom cylinder while pivoting the boom and an attachment connected to the boom, wherein a bad is placed on the attachment; and
calculating a mass of the bad by using a moment of inertia of the pivot of the boom, a damping coefficient of the pivot of the boom, a modulus of elasticity of the pivot of the boom, the inclined angle of the ground surface, an angle of the boom with respect to a horizontal plane, and an angular speed and an angular acceleration of the boom as variables of a rotational dynamic equation for the pivot of the boom, wherein the moment of inertia is equal to $m_1 r_1^2\ m_2 r_2^2$, wherein $m_1$ is a mass of the boom and a bucket, $m_2$ is the mass of the load, $r_1$ is a distance of a first center of gravity from a boom joint, and $r_2$ is distance of a second center of gravity from the boom joint, and
wherein calculating the weight of the load comprises extracting a damping coefficient and an elastic coefficient respectively from a predetermined damping coefficient map and elastic coefficient map corresponding to the change in the pressure of the boom cylinder; and
providing the calculated weight of the load to an operator via an output portion selected from the group consisting of a visual display device and an audio output device,
wherein the angle of the boom with respect to the horizontal plane is equal to a sum of the inclined angle of the ground surface and the boom angle with respect to the inclined angle.

* * * * *